Aug. 17, 1943.  D. U. HUNTER ET AL  2,326,860
ANGLE DRIVE TRANSMISSION
Filed Nov. 12, 1941  2 Sheets-Sheet 1

INVENTOR
DAVID U. HUNTER, VINCENT T. MOORE & JOSEPH MODROVSKY.
BY
ATTORNEY

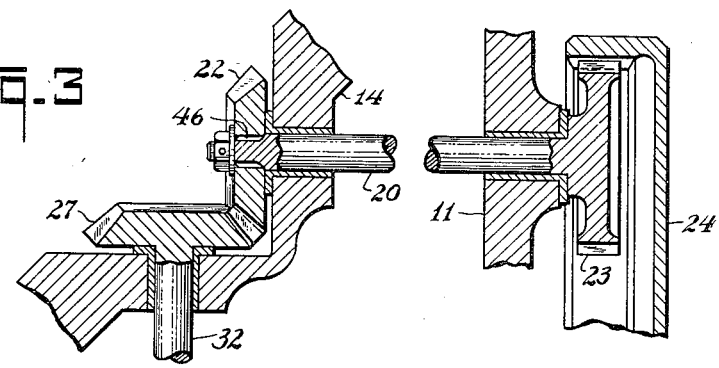
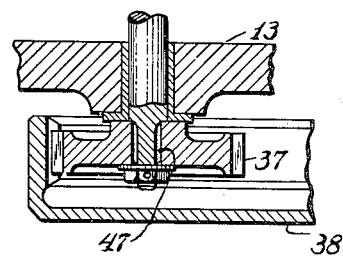
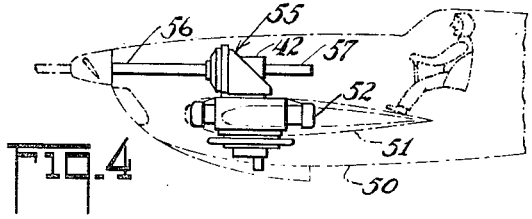
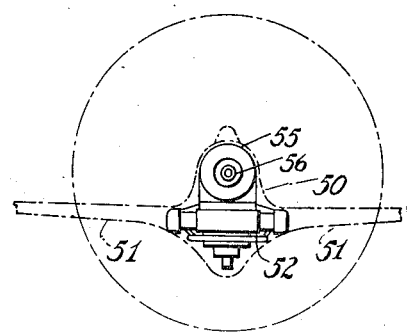
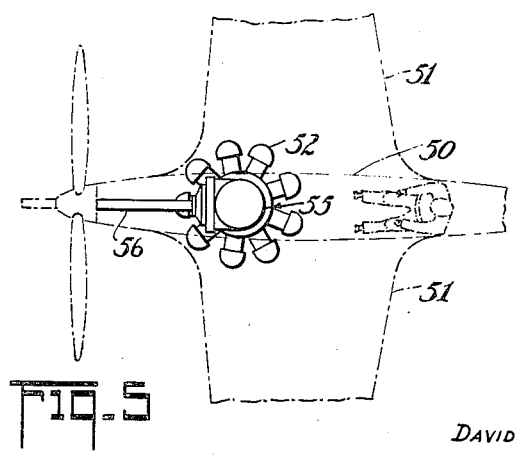

Patented Aug. 17, 1943

2,326,860

UNITED STATES PATENT OFFICE 2,326,860

ANGLE DRIVE TRANSMISSION

David U. Hunter, Cranford, and Vincent T. Moore, Glen Rock, N. J., and Joseph Modrovsky, New York, N. Y., assignors to Wright Aeronautical Corporation, a corporation of New York Application November 12, 1941, Serial No. 418,652

9 Claims. (Cl. 74—410)

This invention relates to bevel gearing and is concerned particularly with a multi shaft angle drive gearset capable of transmitting a large amount of power. The invention is also concerned with the disposition of a power plant in an aircraft in such manner as to utilize the angle drive gearset to best advantage.

An object of the invention is to provide an angle drive assembly in which the power load is divided equally among a plurality of small, high speed bevel gearsets so arranged with respect to each other that they will each assume an equal share of the load. A further object is to provide a bevel gearset utilizing multiple gear contacts which will be both more compact and lighter in weight than a single large bevel gear unit capable of transmitting the same amount of power. A further object of the invention is to provide a novel disposition of an angle drive transmission in an aircraft, in conjunction with an engine whose power shaft is vertically disposed within the aircraft, the propeller shaft extending horizontally and being driven by the vertical power shaft through the angle drive transmission. A further object is to provide an angle drive transmission adapted for use with a cannon or the like whose axis is coincident with the axis of the airplane propeller.

Further objects of the invention will become apparent in reading the annexed description in connection with the drawings, in which:

Fig. 3 is an enlarged fragmentary section through an individual shaft set of the transmission;

Fig. 4 is a side elevation showing gearset and power plant disposition in an aircraft;

Fig. 5 is a plan of the aircraft; and

Fig. 6 is a front elevation of the aircraft.

Figure 1:
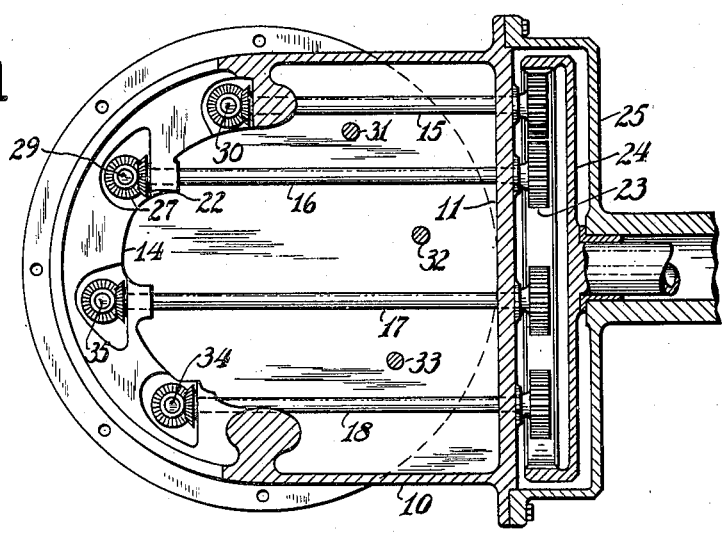
Fig. 1 is a sectional plan of the angle drive gearset.
Figure 2:
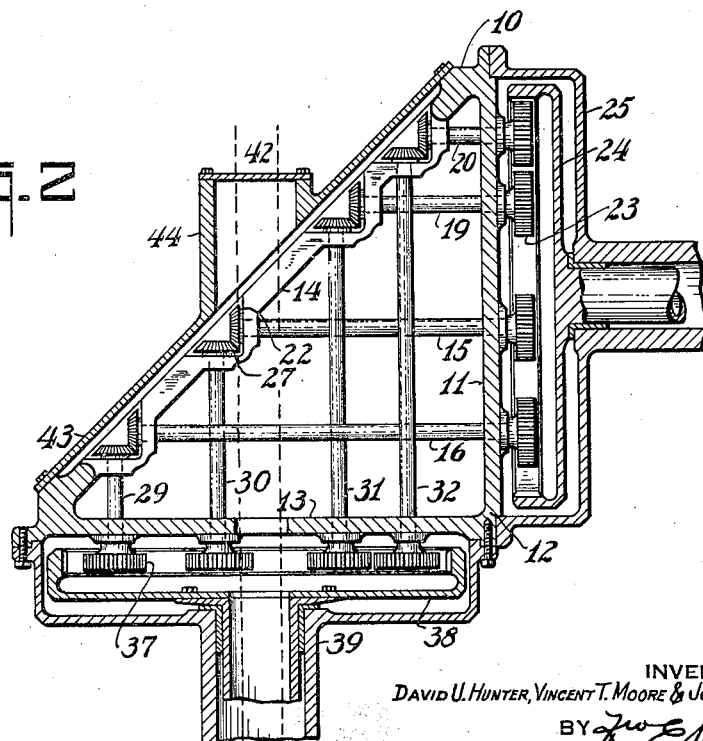
Fig. 2 is a longitudinal section through the gearset.

Referring first to Figs. 1, 2, and 3, we provide a transmission housing 10 comprising a substantially vertical disc or ring 11 tangent at one edge 12, and integral with, a horizontal ring or disc 13. The upper edge of the disc 11 and the lefthand edge of the disc 13 are joined by an elliptical ring or plate 14 sloped at an angle of substantially 45° with respect to the discs 11 and 13. The elliptical member 14 in either plan or end elevation would project as an annulus of substantially the same diameter as either the disc 11 or 13.

Where reference is made to "vertical," "horizontal," etc., this is merely for convenience in description and is not intended to limit the general position of the members in space.

A plurality of layshafts 15 to 20, there being provision for eight such shafts in the embodiment shown, are borne in the disc 11 and in the ring 14 and their axes are normal to the disc 11. At the ring end of each such shaft is a bevel pinion 22, while at the disc end of each such shaft is a pinion 23, the several pinions 23 being driven in unison by a ring gear 24 borne in an auxiliary housing 25 secured to the disc 11. It will be apparent that the several shafts 15 to 20 are circumferentially disposed relative to the gear 24 and are of different lengths, the shortest shaft 20 being at the top of the assembly and the longest shaft 16 being at the bottom of the assembly, as shown in Fig. 2.

Each bevel gear 22 is meshed with an axially vertical bevel gear 27, the several gears 27 being mounted on shafts 29 to 35 borne at their upper ends in the ring 14 and at their lower ends in the disc 13. These shafts project below the disc 13 and carry pinions 37 meshed with a ring gear 38 borne in an extension housing 39 secured to the disc 13. It will be apparent that the several shafts 29 to 35 are of different length, the shortest shaft 35 being at the left end of the assembly and the longest shaft 32 being at the right end of the assembly. The shafts 29 and 32 comprise a driving pair. Similarly, driving pairs are formed by shafts 31 and 19, 30 and 15, 29 and 16, etc. The total length of all shaft sets is the same although the individual lengths of the shafts comprising the sets, vary. Due to the similar aggregate length of the shaft sets, the torsional rigidity of all of them is the same so that the driving torque from the ring gear 24 to the ring gear 38 is divided equally between the several bevel gear connections 22, 27 whereby all gear tooth contacts assume the same load as all other similar gear tooth contacts. The phase relation of the bevel gearsets will differ slightly under driving load, but this is unimportant since each such bevel gear connection is independent of the others.

The assembly above described divides the driving torque among a plurality of small, high speed gear connections since the several layshafts 15 to 20, etc. and 29 to 35, etc. are in stepped-up relation relative to the driving and driven ring gears 24 and 38. The aggregate bulk and weight of the assembly shown will be substantially less than a single large bevel gear connection between the driving and driven shafts. Furthermore, the disposition of the shafts and gears is such that a passage concentric with the driven gear 38 may be established through the transmission, as represented by the dotted lines 42, this passage permitting the installation of a gun or the like in the transmission when the latter is used as an aircraft propeller drive. The gearset is provided with a cover 43 secured to the ring 14 and this may be provided with a boss 44 to establish the passage 42.

Referring briefly to Fig. 3, each bevel pinion 23 is integral with its horizontal shaft such as 20 and each bevel pinion 22 is secured to its shaft through a spline joint 46. Each vertical shaft such as 32, is integral with its bevel pinion 27, while each pinion 37 is secured to its shaft at a spline joint 38. This arrangement permits of proper assembly of the several gear components of the transmission.

Now referring to Figs. 4 to 6, we show, in dot-dash lines, an aircraft fuselage 50 having wings 51 extending laterally therefrom, the fuselage being long and slender to reduce aerodynamic drag. A power plant 52 of the radial cylinder air-cooled type is disposed with the cylinder plane horizontal and its crankshaft axis vertical so that the central portion of the engine lies within the fuselage 50 and so that the cylinders of the engine, in part, extend into the roots of the wings 51. In conventional installations, the engine cylinder disc is normal to the air stream and the large area of this disc causes large drag even though the engine be enclosed within carefully streamlined cowling. By disposing the engine cylinder disc horizontally as shown, the only drag area from the engine is obtained from the side of the cylinders, crankcase and accessory section, which area is much less than the disc area of the cylinders. The angle drive transmission, indicated in its entirety as 5, is secured to one end of the engine so that the output shaft of the transmission, 56, is horizontal and parallel to the flight path. A cannon 57 is indicated as passing through the transmission, as previously described. The power plant disposition above described, gives extremely low frontal area, as is shown in Fig. 6.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a gear transmission, input and output shafts disposed at a right angle to one another, a first plurality of layshafts spaced around, parallel to and driven by the input shaft, the layshaft most remote from the output shaft being short and said layshafts as they near the output shaft being proportionally longer, bevel pinions on the ends of said layshafts, a second plurality of layshafts spaced around, parallel to and in driving relation with the output shaft, and bevel gears on the layshafts of the second plurality respectively meshed with the layshafts of the first plurality.

2. In an angle drive transmission, a plurality of sets of shafts each set having a bevel gear driving connection therebetween and the several sets having the same overall length, means for driving the plurality in unison at one end of the shaft sets, and means driven by the plurality at the other end of the shaft sets.

3. In an angle drive transmission, a plurality of circumferentially disposed parallel shafts each terminating at one end in a plane normal to the shafts, said shafts terminating at their other ends in a plane making an angle of 45° with the shaft axes whereby said shafts vary in length from one side of the plurality to the other, a bevel gear on the sloped plane end of each shaft, and a second plurality of circumferentially disposed parallel shafts whose axes are normal to the shaft axes of the first plurality each shaft of the second plurality having a bevel gear at one end engaging one of the first mentioned bevel gears, said second plurality of shafts terminating at their other ends in a common plane normal to their axes, the respective gear connected shaft sets in the two pluralities all having the same length.

4. In an angle drive transmission, a plurality of circumferentially disposed parallel shafts each terminating at one end in a plane normal to the shafts, said shafts terminating at their other ends in a plane making an angle of 45° with the shaft axes whereby said shafts vary in length from one side of the plurality to the other, a bevel gear on the sloped plane end of each shaft, a second plurality of circumferentially disposed parallel shafts whose axes are normal to the shaft axes of the first plurality each shaft of the second plurality having a bevel gear at one end engaging one of the first mentioned bevel gears, said second plurality of shafts terminating at their other ends in a common plane normal to their axes, the respective gear connected shaft sets in the two pluralities all having the same length, a joint driving means for the shafts of the first plurality, and a joint driven means drivably connected to the shafts of the second plurality, respectively at the opposite ends of said shafts from said bevel gears.

5. In an angle drive transmission, a frame comprising right angled discs substantially tangent to one another and an elliptical ring tangent at its ends to the discs and disposed at an angle of substantially 45° relative thereto, a plurality of bevel gear pairs disposed around said ring, a plurality of shafts normal to one disc and borne therein each connected to one bevel gear of the pairs, and a second plurality of shafts normal to the other disc and borne therein, each connected to the other bevel gear of the pairs.

6. A plurality of right-angled shaft sets, the axes of the shafts of each set intersecting and the shafts of each set having a bevel gear driving connection, said driving connections being disposed in a common plane angled with respect to both shafts of each set, coplanar means to drive some of the shafts of the sets in unison, and coplanar means driven by the other shafts of the sets, all shaft sets having the same effective length whereby the angular deflection of all shaft sets, under torsional load, is the same to distribute the driving load equally among the several shaft sets.

7. In an angle drive transmission, coplanar input and output shafts disposed at an angle to each other, a plurality of coplanar pairs of layshafts, corresponding layshafts of each pair being spaced around, parallel to and driven by the input shaft, the other layshafts of each pair being spaced around, parallel to and in driving relation with the output shaft, the axis of each pair of layshafts intersecting and each pair of layshafts having a gear drive connection, the effective length of each pair of layshafts being the same whereby the angular deflection of each pair of layshafts, under torsional load, is the same to distribute the driving load equally among the plurality of pairs of layshafts.

8. In an angle drive transmission, input and output shafts disposed at an angle to each other, a first plurality of layshafts spaced around, parallel to and driven by the input shaft, the layshaft most remote from the output shaft being short and said layshafts as they near the output shaft being proportionally longer, bevel gears on the ends of said layshafts, a second plurality of layshafts spaced around, parallel to and in driving relation with the output shaft, and bevel gears on the ends of the layshafts of the second plurality respectively meshed with the bevel gears on the ends of the layshafts of the first plurality.

9. In an angle drive transmission, coplanar input and output shafts disposed at an angle to each other, a plurality of coplanar pairs of layshafts, corresponding layshafts of each pair being spaced around, parallel to and driven by the input shaft, the other layshafts of each pair being spaced around, parallel to and in driving relation with the output shaft, the axis of each pair of layshafts intersecting and each pair of layshafts having a gear drive connection, said drive connections being in a common plane so disposed that the bisector of the angle between the input and output shafts is perpendicular to said plane.

DAVID U. HUNTER.
VINCENT T. MOORE.
JOSEPH MODROVSKY.